(12) United States Patent
Kito et al.

(10) Patent No.: US 7,342,604 B2
(45) Date of Patent: Mar. 11, 2008

(54) PICTURE FILING DEVICE, DIGITAL CAMERA AND FRAME-PICTURE MANAGING METHOD

(75) Inventors: Eiichi Kito, Kanagawa (JP); Ryo Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 994 days.

(21) Appl. No.: 10/388,477

(22) Filed: Mar. 17, 2003

(65) Prior Publication Data

US 2003/0174217 A1 Sep. 18, 2003

(30) Foreign Application Priority Data

Mar. 15, 2002 (JP) .............................. 2002-071746

(51) Int. Cl.
*H04N 5/76* (2006.01)
(52) U.S. Cl. ................................ 348/231.2; 348/333.05
(58) Field of Classification Search ........... 348/333.05, 348/333.11, 231.2, 231.4, 231.5
See application file for complete search history.

(56) References Cited

U.S. PATENT DOCUMENTS

| 5,633,678 | A  | * | 5/1997  | Parulski et al.  | 348/231.5 |
| 5,652,927 | A  | * | 7/1997  | McIntyre         | 396/108   |
| 6,580,437 | B1 | * | 6/2003  | Liou et al.      | 715/719   |
| 6,680,749 | B1 | * | 1/2004  | Anderson et al.  | 348/231.99|
| 6,760,065 | B1 | * | 7/2004  | Whitcher         | 348/231.2 |
| 6,810,404 | B1 | * | 10/2004 | Ferguson et al.  | 707/200   |
| 2002/0051641 | A1 | * | 5/2002 | Nagaoka         | 396/429   |
| 2003/0112357 | A1 | * | 6/2003 | Anderson        | 348/333.05|
| 2003/0174219 | A1 | * | 9/2003 | Iijima          | 348/231.99|

FOREIGN PATENT DOCUMENTS

| JP | 11-98454    | 4/1999 |
| JP | 2000-236503 | 8/2000 |

* cited by examiner

*Primary Examiner*—Tuan Ho
(74) *Attorney, Agent, or Firm*—Sughrue Mion, PLLC (57) ABSTRACT

A digital camera is provided with a picture filing key including a grouping button. Upon turning on the grouping button, a grouping mode is set. When a picture is taken under the grouping mode, link information is added to image data to be recorded in a memory card. In virtue of this, the pictures are grouped. By operating the picture filing key, it is possible to delete the picture from the group, to link the groups, and to divide the group. When the pictures recorded in the grouped state are put into an application, which is capable of distinguishing the link information, it is possible to transfer and copy the data group by group. Management of the data becomes easy.

10 Claims, 11 Drawing Sheets

FIG. 5A
BEFORE LINKAGE

FIG. 5B
AFTER LINKAGE

FIG. 6A BEFORE DIVISION

FIG. 6B AFTER DIVISION

| | PICTURE FILE NAME |
|---|---|
| GROUP1 | DSC0001.JPG |
| | DSC0002.JPG |
| | DSC0003.JPG |
| | DSC0004.JPG |
| | DSC0005.JPG |
| GROUP2 | DSC0010.JPG |
| | DSC0011.JPG |
| | DSC0012.JPG |
| | DSC0013.JPG |

FIG. 13

| | LINK INF. | PHOTOGRAPHIC-PLACE INF. | SUBJECT INF. |
|---|---|---|---|
| PIC1 | EXISTENCE (ID=1) | A | X |
| PIC2 | EXISTENCE (ID=1) | A | X |
| PIC3 | EXISTENCE (ID=1) | A | X |
| PIC4 | EXISTENCE (ID=1) | B | X |
| PIC5 | EXISTENCE (ID=1) | B | Y |
| PIC6 | NONEXISTENCE | B | Y |
| PIC7 | NONEXISTENCE | B | Y |
| PIC8 | NONEXISTENCE | C | Z |
| PIC9 | NONEXISTENCE | C | Z |
| PIC10 | EXISTENCE (ID=2) | C | Z |
| PIC11 | EXISTENCE (ID=2) | C | Z |
| PIC12 | EXISTENCE (ID=2) | D | Z |
| PIC13 | EXISTENCE (ID=2) | D | Z |

PICTURE FILING DEVICE, DIGITAL CAMERA AND FRAME-PICTURE MANAGING METHOD

BACKGROUND OF THE INVENTION

1. Field of the Invention

The present invention relates to a picture filing device for systematically filing pictures in a recording medium, and relates to a digital camera having a picture filing function, and further relates to a method for managing a plurality of frame pictures recorded in a recording medium.

2. Description of the Related Art

A digital camera for recording a photographed frame picture is known. In this kind of the digital camera, the photographed frame picture is recorded in a recording medium of a memory card and so forth. The picture is recorded as digital data. Thus, when the digital data is taken into a personal computer or the like, it is possible to watch the picture by utilizing viewer software thereof. Meanwhile, in a case that it is desired to classify the pictures into photo-categories of sports and excursions, for instance, sub-folders of a sport folder and an excursion folder are made in a picture folder of the recording medium. The respective pictures may be classified into the sub-folders. Whereas the sub-folder is made by a personal computer in general, a technology for executing this operation with a digital camera is proposed (see Japanese Patent Laid-Open Publication Nos. 11-98454 and 2000-236503, for example).

Upon booting the viewer software for the picture, an index-picture is displayed to list the pictures included in the picture folder. In this index-picture, the frame pictures are displayed as thumbnail images. When the sub-folders are made, folder names thereof are displayed together with icons representing the sub-folders. Upon clicking the icon of the sub-folder with a mouse, the corresponding sub-holder is opened to display the frame picture contained therein. By making the sub-folder, it is possible to copy and move the pictures in a lump sub-folder by sub-folder. Thus, management of the pictures becomes easy.

However, operations for making the sub-folder with a personal computer and for systematically classifying the photographed frame pictures are troublesome operations for a person unused to the personal computer. Meanwhile, the recording media of the memory card and so forth tend to have high capacity and are expected to have much higher capacity in future. In that case, the operation for systematically classifying the pictures plentifully recorded is likely to be an extremely troublesome operation.

Further, in the method for classifying the picture frames by making the sub-folder with the digital camera, there sometimes arises a problem concerning compatibility of a picture-storing format when the memory card is read by a different model and a card reader. In the case that there arises this kind of problem, it is impossible to read the picture file stored in the sub-folder. Since the format for storing the picture taken by the digital camera is defined in accordance with a standard, the sub-folder is not recognized by the other model and so forth which are not adaptable thereto, although the sub-folder is made. Thus, in this case, reading the picture file is likely to be impossible.

SUMMARY OF THE INVENTION

In view of the foregoing, it is a primary object of the present invention to provide a picture filing device, a digital camera and a frame-picture managing method, in which the photographed pictures recorded in a recording medium are easily classified without disturbing compatibility of a picture-storing format.

In order to achieve the above and other objects, the picture filing device according to the present invention is provided with an information recorder for recording picture-grouping information in a recording medium. The picture filing device records a plurality of frame pictures in a recording medium, and the picture-grouping information is used for grouping these frame pictures. It is possible to manage the frame pictures group by group, wherein the group is defined on the basis of the picture-grouping information.

The grouping information is link information for linking the frame pictures of one group in a daisy-chain style.

A picture outputting device is provided for outputting an index-picture showing the contents recorded in the recording medium. When the group exists in the recording medium, an icon standing for the group or a representative frame representing the group is displayed in the index-picture.

The digital camera according to the present invention is provided with an information recorder for recording picture-grouping information in a recording medium. The digital camera records frame pictures, which are obtained by an imaging device, in the recording medium. The picture-grouping information is used for grouping the frame pictures. It is possible to manage the frame pictures group by group, wherein the group is defined by the picture-grouping information.

The grouping information is link information for linking the frame pictures of one group in a daisy-chain style.

The digital camera is provided with a display member for displaying an index-picture which shows the contents recorded in the recording medium. When the group exists in the recording medium, an icon standing for the group or a representative frame representing the group is displayed in the index-picture.

When the icon or the representative frame is selected in the index-picture to instruct data transfer to other apparatus, all the frame pictures of one group are transferred.

Plural kinds of key items used for grouping may be set, and it is possible to make up the group of the frame pictures on the basis of the set key item.

In the frame-picture managing method according to the present invention, grouping information used for grouping the frame pictures is recorded in the recording medium. In this method for managing the frame pictures recorded in the recording medium, the plural frames are managed group by group, wherein the group is defined on the basis of the grouping information.

According to the present invention, the picture grouping information for grouping the picture frames is recorded in the recording medium, and the frame pictures are managed group by group defined by the picture-grouping information. Thus, the pictures are easily classified.

Moreover, the groups are managed in accordance with the grouping information so that it is unnecessary to form a tree structure of the folders, wherein the sub-folders are made relative to each group. Thus, the compatibility of the picture-storing format is not disturbed.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
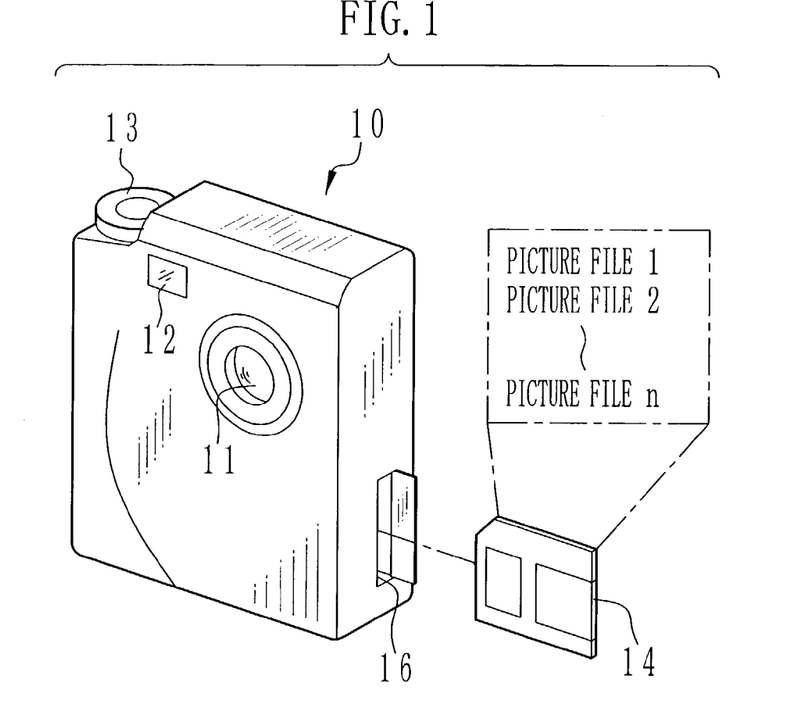
FIG. 1 is a perspective view of a digital camera.

As shown in FIG. 1, a front side of a digital camera 10 is provided with a taking lens 11 and a viewfinder object-side window 12. An upper side of the digital camera 10 is provided with a shutter button 13, and a lateral side thereof is provided with a slot 16 into which a memory card 14 is set. As to the memory card 14, Smart Media (trade name) are used, for instance. The smart media, however, are not exclusive. Various memory cards of xD Picture Card (trade name), Compact Flash (trade name), a memory card of a PC card type, and so forth may be used. Moreover, besides the memory card, recording media of Microdrive (trade name) and so forth maybe used.

A picture-file format and a storing style of photographed-image data relative to the memory card 14 are defined by Exif standard and DCF (Design rule for Camera File system) standard made by JEITA (Japan Electronics and Information Technology Industries Association). In the memory card 14, a picture folder is made in accordance with DCF specifications, and the photographed-image data is stored in the picture folder as a picture file of a predetermined file style (for instance, JPEG style and so forth) conforming to Exif specifications. The picture file of the Exif style includes, besides the image data, additional information concerning a photographic date, a type name of a camera, and so forth.

Figure 2:
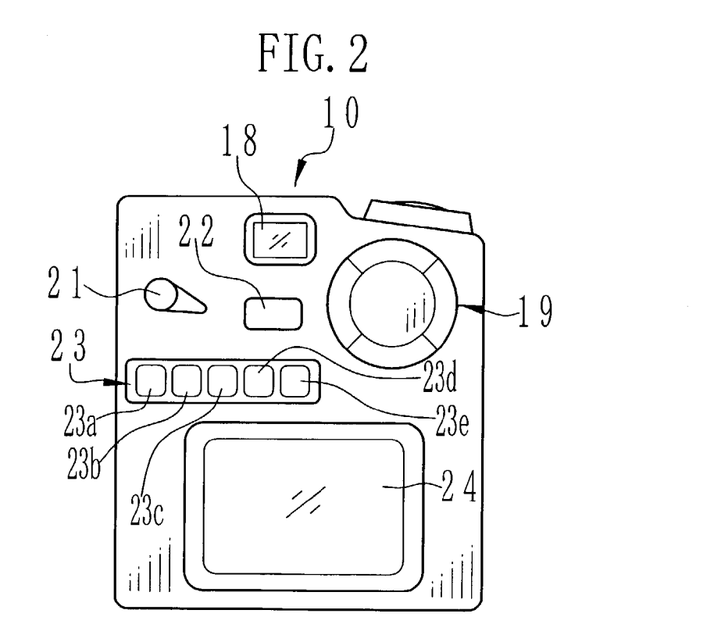
FIG. 2 is a rear view of the digital camera.

A rear side of the digital camera 10 is provided with a viewfinder eye-side window 18, a multipurpose key 19, a mode changing key 21, a determination/execution button 22, a picture filing key 23, and a display panel 24. The mode changing key 21 changes a photography mode for taking a picture, and a playback mode for reproducing the picture recorded in the memory card 14. In the photography mode, the display panel 24 works as an electronic viewfinder. In the playback mode, a frame picture read out of the memory card 14 is displayed on the display panel 24.

Further, the display panel 24 shows a setting picture for deciding various settings. Various setting items are displayed in the setting picture. A user operates the multipurpose key 19 and the determination/execution button 22, watching the setting picture, to set the various items.

The picture filing key 23 is an operation key used for classifying the pictures to be recorded in the memory card 14 at the time of photographing. The picture filing key 23 comprises a grouping button 23a, a partitioning button 23b, a deleting button 23c, a linking button 23d and a dividing button 23e.

The grouping button 23a is used for switching to a grouping mode in that grouping information for grouping a plurality of picture files are recorded in the memory card 14. By grouping the picture files, it becomes possible to manage the picture files group by group. As to the grouping information, for example, is used link information for linking the picture files of a single picture group in a daisy-chain style. The link information is stored in the picture file together with the image data.

Figure 3:
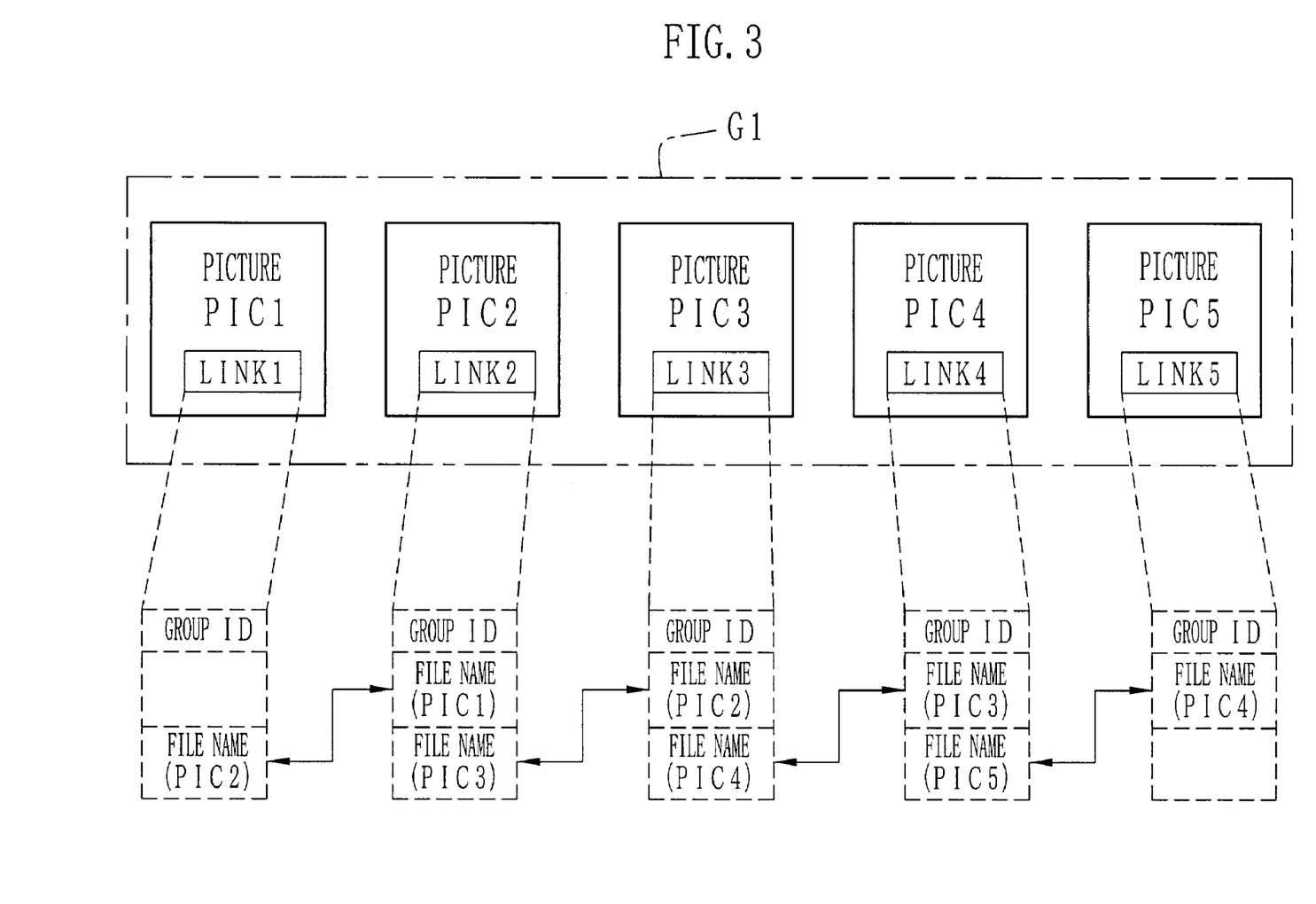
FIG. 3 is an explanatory illustration showing a relationship between a picture group and link information.

As shown in FIG. 3, the pictures PIC1 through PIC5 accompany the recorded link information LINK 1 through LINK 5 respectively. As the link information of each picture, are recorded group ID and file names of the pictures adjacently recorded relative to the present picture. For example, the link information LINK 3 of the picture PIC3 includes the group ID and the file names of the pictures PIC2 and PIC4, which are photographed before and after the picture PIC3. The group to which the respective picture files belong is defined by the link information.

In a case of using album editing software by which the link information is distinctively read, it is possible to read and write the picture files group by group. Thus, a moving operation and a copying operation of the picture files may be easily performed. For example, upon designating any picture in the group and instructing the moving operation or the copying operation, the above-mentioned software refers to the link information of the respective picture files in turn to identify all the picture files of the group one after another on the basis of the link information. All the picture files of the group are identified in this way so that all the frame pictures of the group may be moved or copied out only by designating the sole frame picture without designating all the frame pictures of the group.

In this embodiment, the file name is used as a component of the link information. However, the file name is not exclusive. It is sufficient to be distinctive information for distinguishing the picture files. As to the distinctive information, it is conceived to combine a manufacturer name of a camera, a type name thereof, a serial number thereof, and time stamp, for example. By using this kind of the distinctive information, the link information is prevented from becoming useless even if a user changes the file name.

The partitioning button 23b is used when the new group is made and this group is separated from the prior group. When a picture is taken under the grouping mode, the link information is recorded so as to classify the taken picture into a certain group G1, for example. In a case a new group G2 is made separately from the group G1, the partitioning button 23b is pressed. Upon this, the link information is recorded such that the pictures taken after the next photographing are classified into the group G2. In virtue of the partitioning button 23b, it is possible to make a plurality of the groups in the sole memory card 14.

Figure 4A:
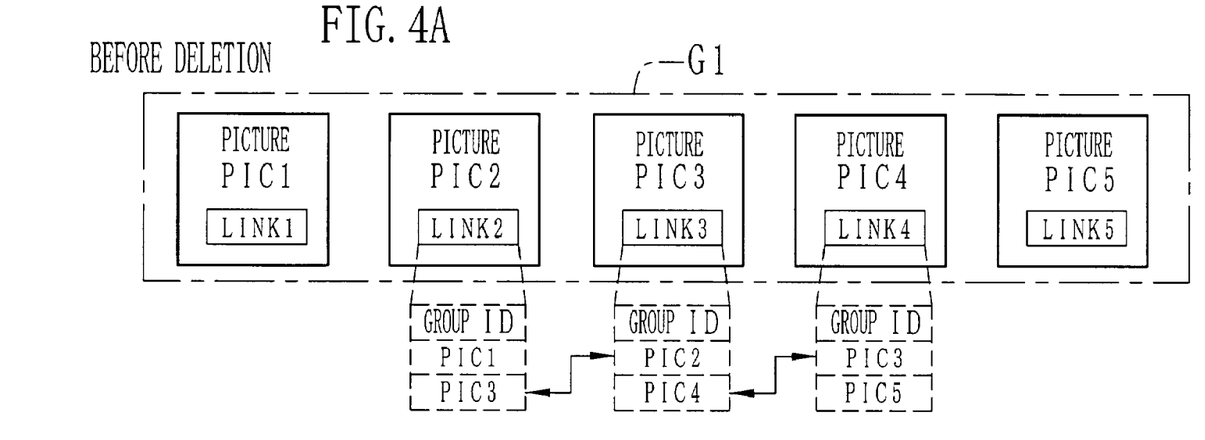
FIGS. 4A and 4B are explanatory illustrations showing the link information changing before and after deleting the picture from the group.
Figure 4B:
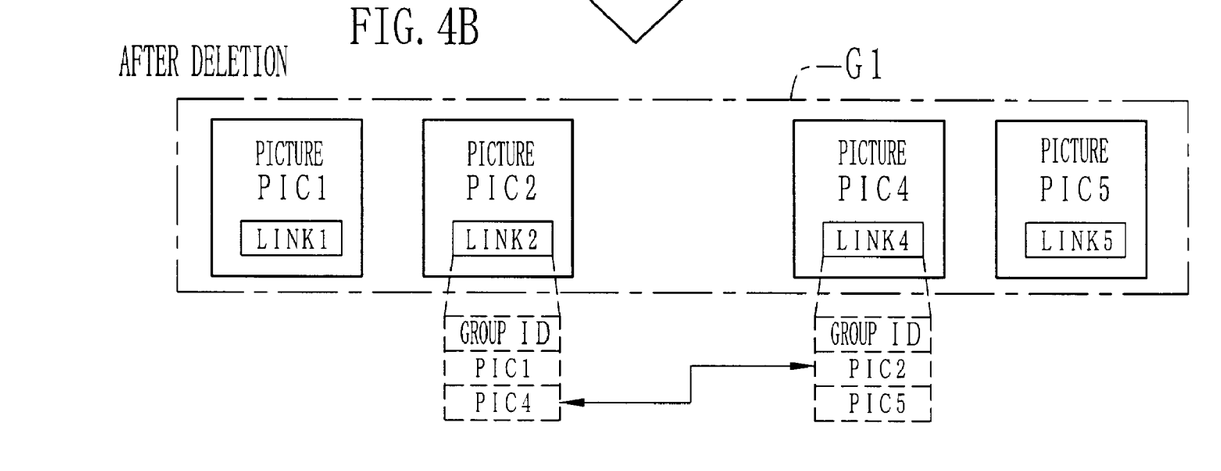

The deleting button 23c is used when the picture is deleted from the group. As shown in FIGS. 4A and 4B, upon deleting the picture PIC3 from the group G1, are rewritten the link information LINK2 and LINK4 of the pictures PIC2 and PIC4, which are adjacent to the picture PIC3. Incidentally, the picture deleted from the group exists in the memory card 14 as the picture free from the group.

Figure 5A:
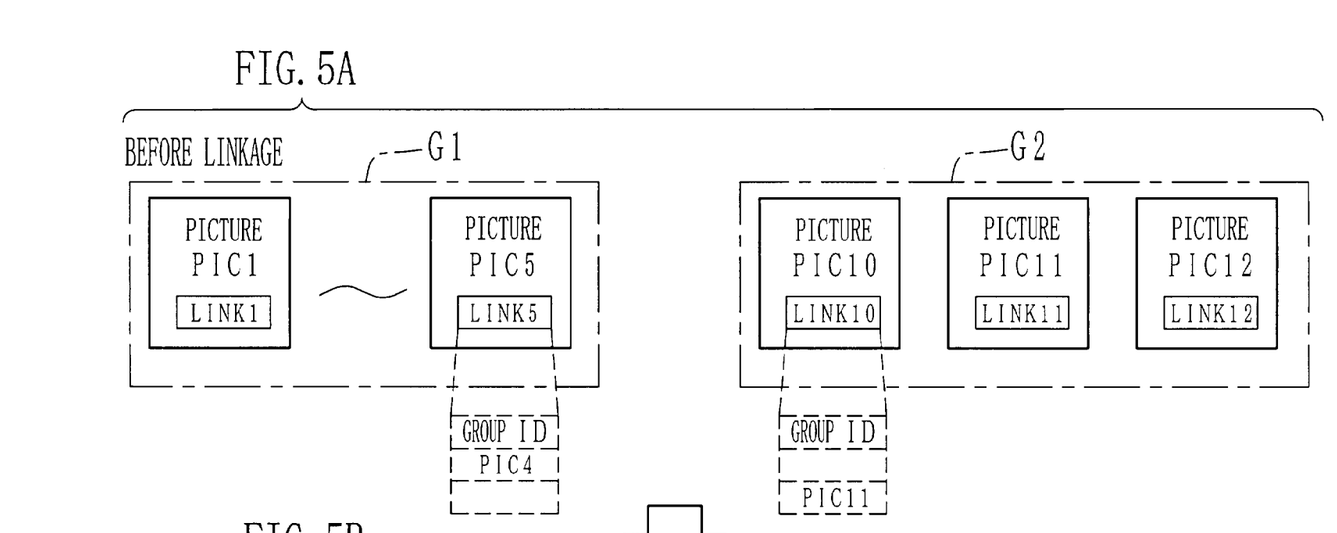
FIGS. 5A and 5B are explanatory illustrations showing the link information changing before and after linking the group.
Figure 5B:
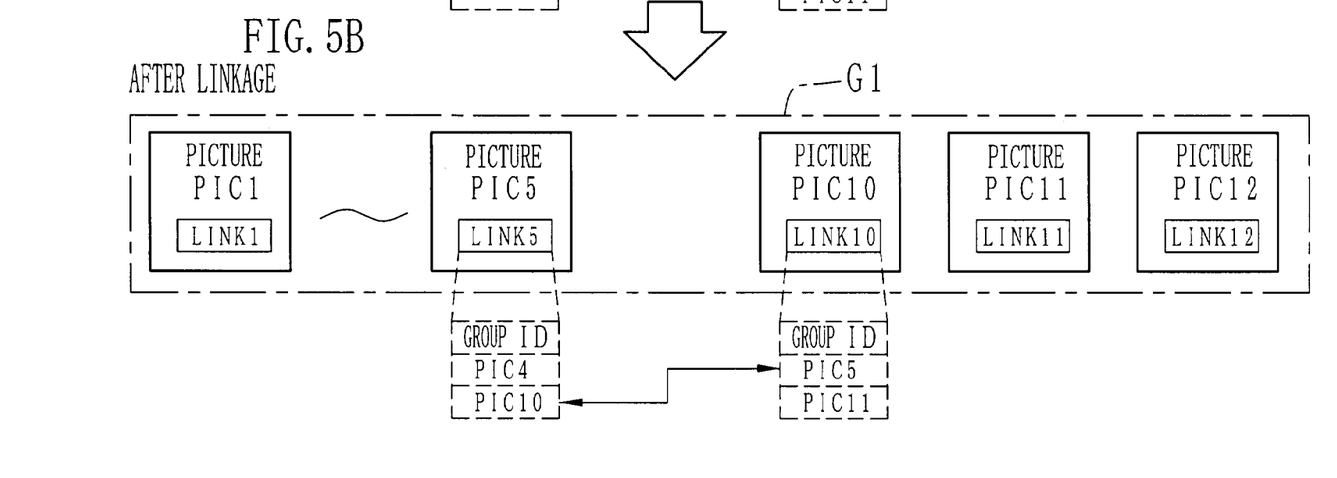

The linking button 23d is used when a plurality of the groups are linked as a single group. As shown in FIGS. 5A and 5B, when the group G1 is linked with the group G2 including three pictures PIC10 through PIC12, the link information LINK5 of the last picture PIC5 of the group G1 is rewritten. At the same time, the link information LINK10 of the first picture PIC10 of the group G2 is rewritten as well. In other words, the link information of the selected pictures of the respective groups are rewritten. Further, with respect to the link information LINK10 to LINK12 of the pictures PIC10 to PIC12 included in the group G2, the group ID thereof are also rewritten.

Figure 6A:
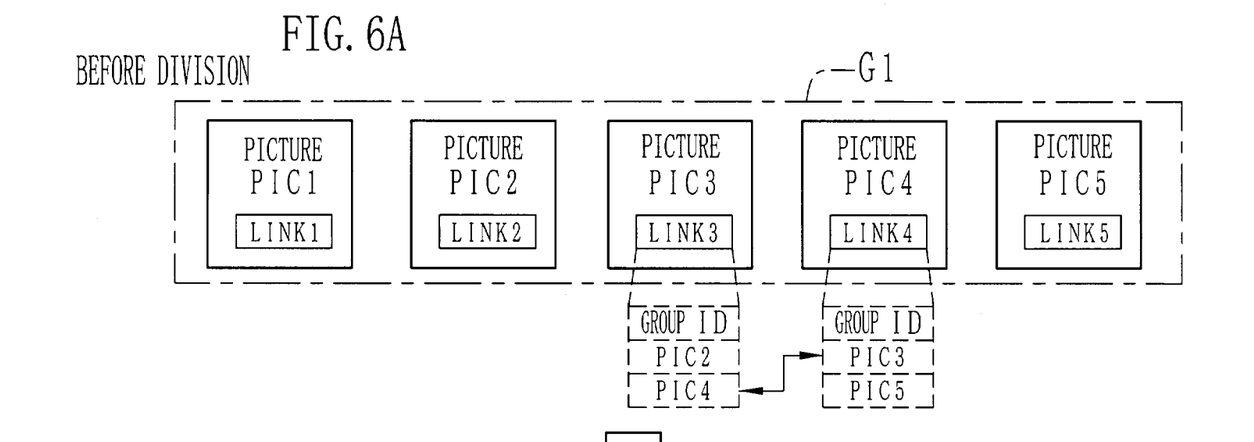
FIGS. 6A an 6B are explanatory illustrations showing the link information changing before and after dividing the group.
Figure 6B:
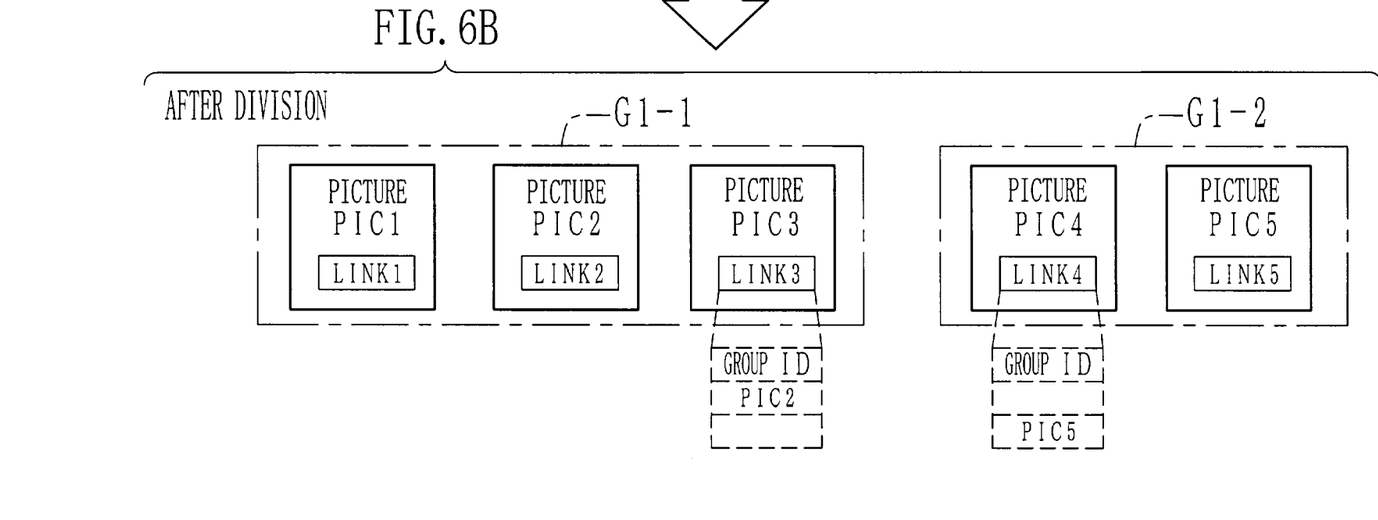

The dividing button 23e is used when a single group is divided into plural groups. As shown in FIGS. 6A and 6B, when the group G1 is divided into the group G1-1 and the group G1-2, the link information LINK3 and LINK4 of the pictures PIC3 and PIC4 are respectively rewritten. In other words, the link information of the selected pictures of the original group are rewritten. In this case, the group G1-1 includes the pictures PIC1 to PIC3, and the group G1-2 includes the pictures PIC4 and PIC5. Further, the group ID of the respective pictures are also rewritten.

In this way, it is possible to file and record the pictures at the time of photographing so that it is feasible to dispense with a troublesome operation in that a personal computer or the like is used later to classify the pictures. With respect to the picture filing key, an additional button may be provided besides the above buttons so as to be capable of newly adding the picture to the existing group.

Figure 7:
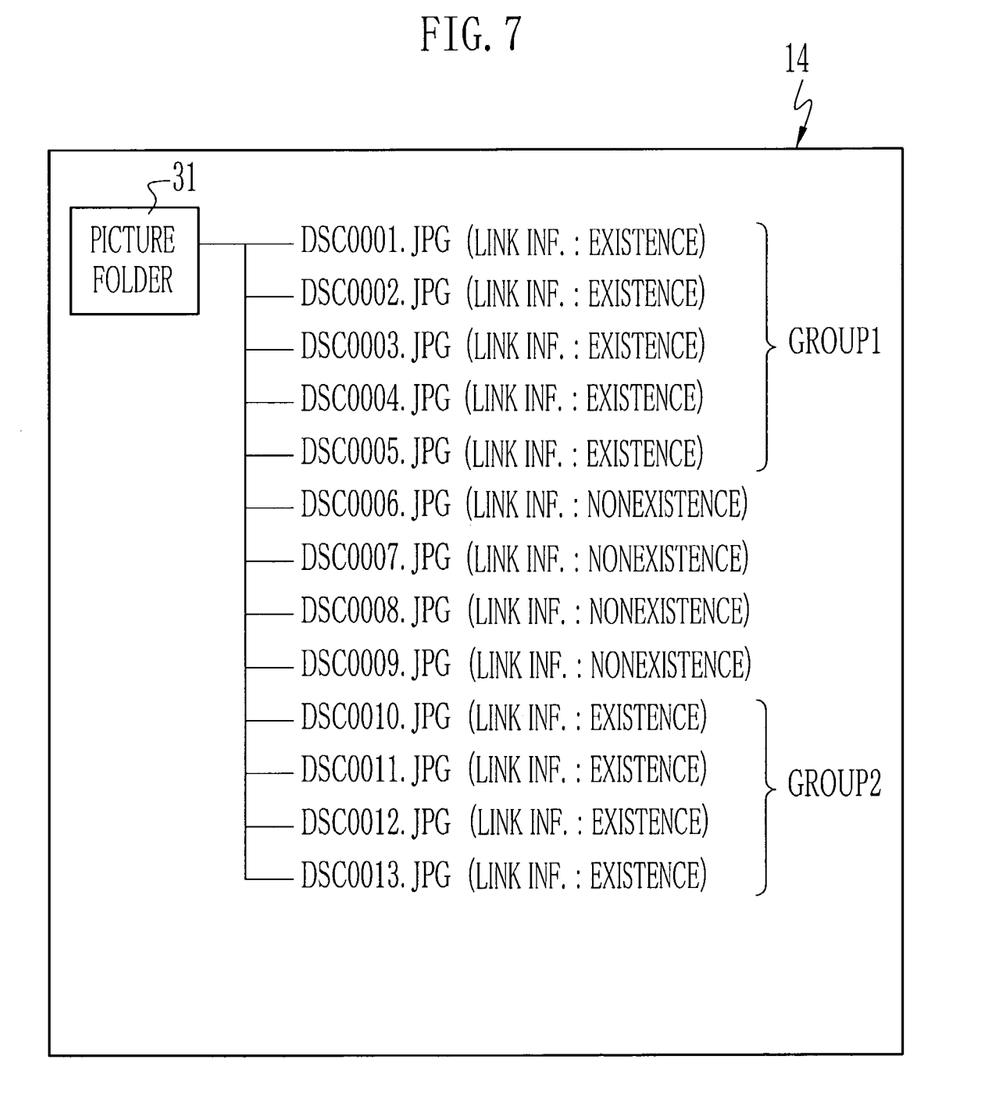
FIG. 7 is an explanatory illustration showing a format for storing a picture file in a memory card.

FIG. 7 shows a format for storing the picture files in the memory card 14. A picture folder 31 based on the DCF standard is made in the memory card 14, such as described above. All the picture files (DSC000n. JPG) are stored in the picture folder 31. The picture folder 31 stores the grouped picture files (having the link information) and the non-grouped picture files (having no link information) in a mixed state. The group of the picture files is managed on the basis of the link information. Differently from the digital camera introduced in the related art, sub-folders are not made for each group and the groups are not managed by a tree structure of the folders.

In this way, the groups are managed on the basis of the link information without depending on the tree structure of the folders. Thus, a problem concerning compatibility of a picture-storing format is not caused when reading the picture file of the memory card 14 with another model, a card reader and so forth. For instance, is not caused a problem in that the picture of the sub-folder is impossible to be read.

Figure 8:
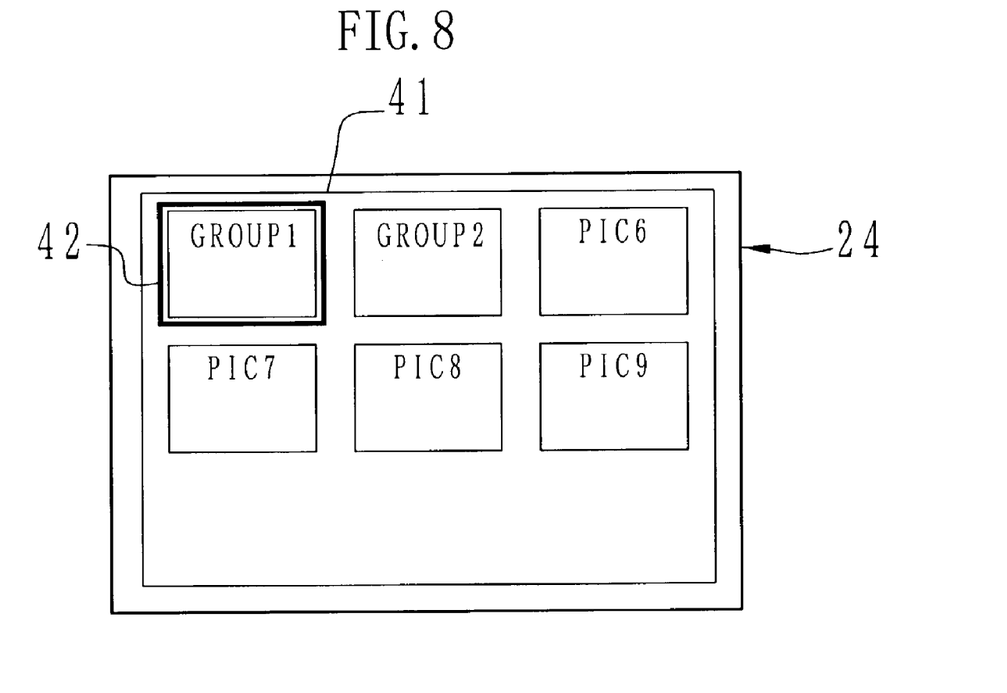
FIG. 8 is an explanatory illustration showing an index-picture of folder.

The picture file recorded in the memory card 14 is reproduced on the display panel 24. FIG. 8 shows an example of an index-picture of folder listing the pictures included in the picture folder of the memory card 14. In the memory card 14, the pictures belonging to the groups G1 and G2 are recorded. Moreover, the pictures PIC6 to PIC9 are also recorded in the memory card 14. In the index-picture 41, the pictures PIC6 to PIC9 free from the group are displayed as thumbnail images.

Meanwhile, with respect to the grouped pictures, a representative frame representing the group is merely displayed in the index-picture 41. An indication for distinguishing the representative frame of the group is displayed in the representative frame or at a near portion thereto. The representative frame is a leading frame of the group, for example. It is needless to say that the representative frame may be the last frame of the group. In another way, the representative frame may be changed by setting any one of the frames. Further, instead of the representative frame, an icon standing for the group may be displayed.

A cursor 42 for selecting any one of the frames is displayed within the index-picture 41. The desired frame is selected with the cursor 42. And then, upon pressing the determination/execution button 22 for example, the selected picture is enlarged and displayed when this picture is not grouped.

Figure 9:
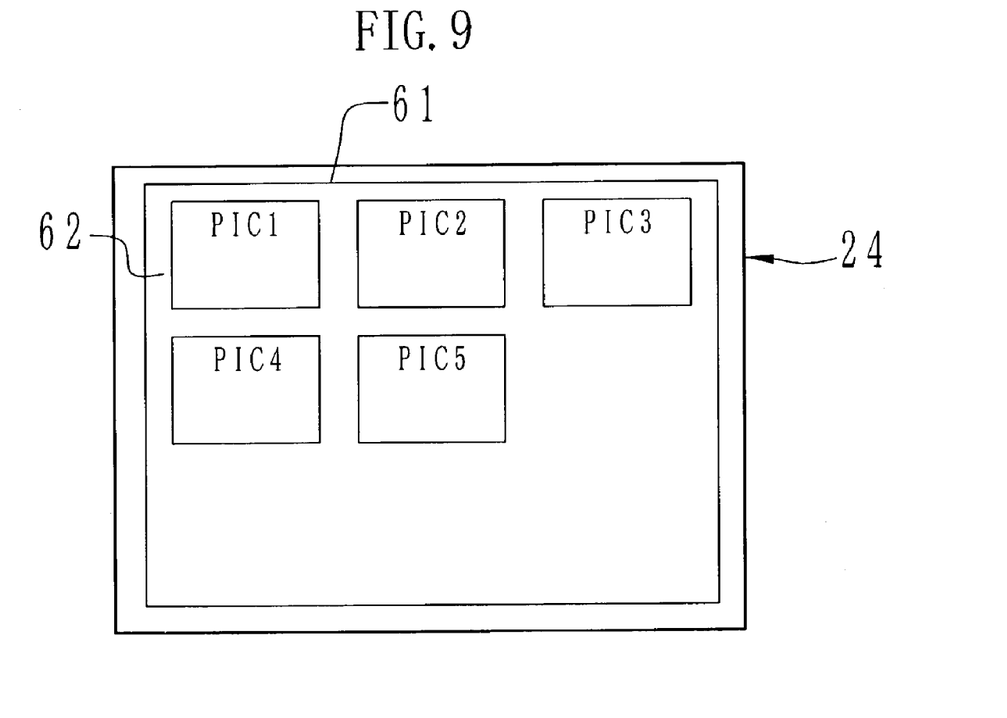
FIG. 9 is an explanatory illustration showing an index-picture in group.

In the meantime, when the selected frame is the representative frame, the index-picture of folder is changed to an index-picture 61 in group, such as shown in FIG. 9, wherein the respective pictures of the group are displayed as thumbnail images in an index state. A cursor 62 is set to the desired frame in the index-picture 61. Then, upon pressing the determination/execution button 22, the corresponding picture is enlarged and displayed.

As described above, regarding the pictures belonging to the group, the representative frame thereof is merely displayed in the index-picture 41. Moreover, the respective pictures of the group are displayed in the index-picture 61 which is different from the index-picture 41. Thus, it is easy to know how the pictures are classified. Since the representative frame is displayed instead of an icon of the folder, it is easily and immediately known how sorts of the pictures are gathered as the group.

An effect caused by displaying the group with the representative frame in the index-picture 41 seems to be greater as a number of the pictures to be stored increases in accordance with a high-capacity tendency of the memory card 14. In the meantime, a direct printing method falls into popularization in recent years. In the direct printing method, a digital camera and a printer are directly connected and image data is directly transferred from the digital camera to the printer to perform printing. The digital camera and the printer are provided with a display panel having a small picture size. Through the display panel, a picture-selecting operation and a print-instructing operation are carried out. It is considered that occasions for these operations increase in accordance with the popularization of the direct printing method. When the picture size is small, a picture scroll has to be repeated in order to skim through a large number of frame pictures. Thus, it is difficult to search a desired frame picture. However, by displaying the group with the representative frame such as disclosed in the present invention, an operation for searching the frame picture may be improved.

When the group is edited with the deleting button 23c, the linking button 23d, the dividing button 23e, and so forth after photographing, the respective index-pictures 41 and 61 are utilized. In a case the picture is deleted from the group, the cursor 62 is set to the picture to be deleted in the index-picture 61, and then, the deleting button 23c is pressed.

In a case the group is linked or divided, the representative frame of the group to be linked or divided is selected with the cursor 42. Successively, the linking button 23d or the dividing button 23e is pressed.

Figure 10:
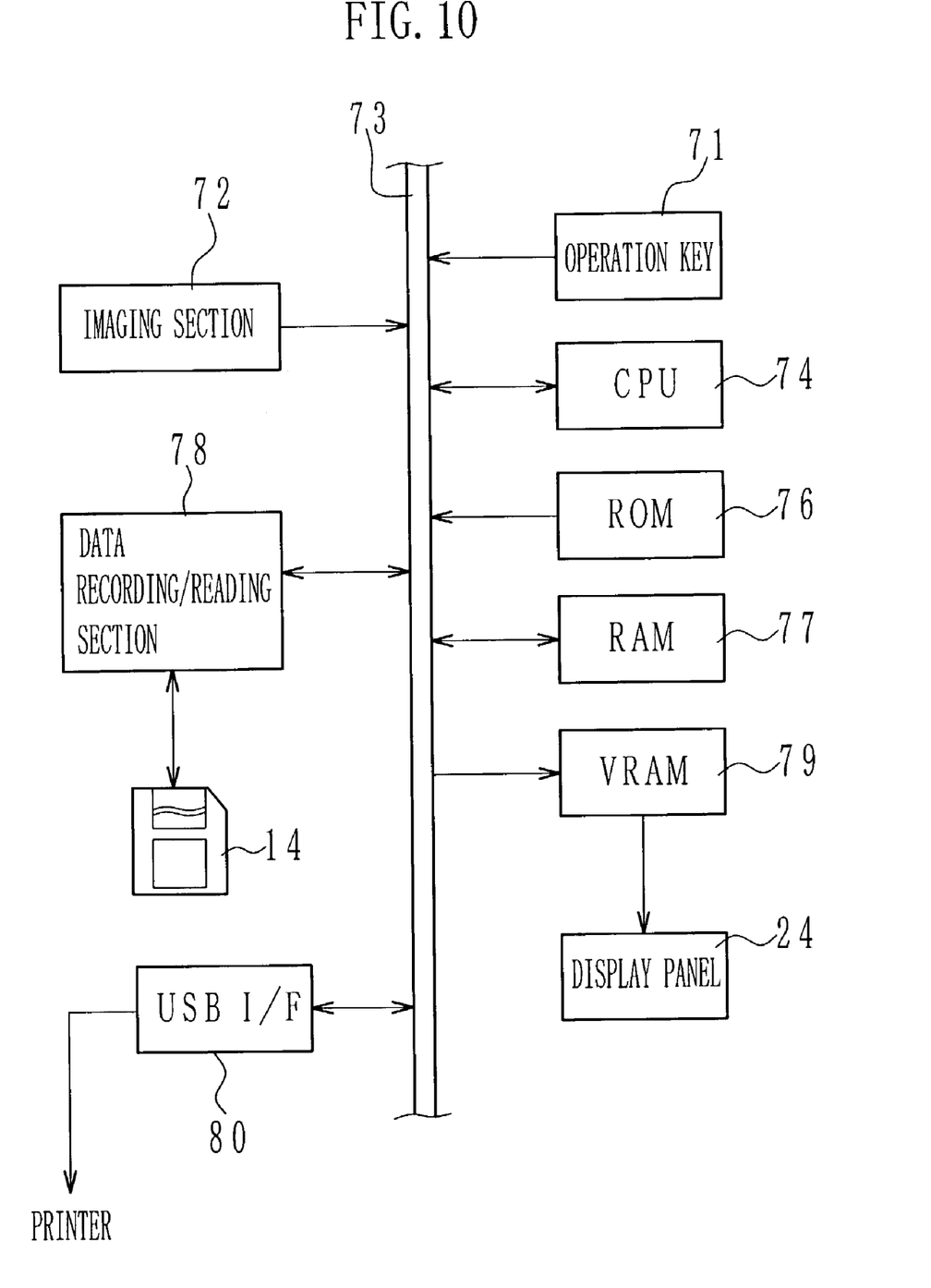
FIG. 10 is a block diagram showing a structure of the digital camera.

FIG. 10 is a block diagram of the digital camera 10. An imaging section 72 comprises a taking lens, a CCD, an A-D converter and so forth. Image data from the imaging section 72 is transferred to a data recording/reading section 78, which accesses the memory card 14 to record the image data and to read the recorded image data.

A CPU 74 controls each section of the apparatus connected via a data bus 73. An operation key 71 includes the shutter button 13, the picture filing key 23 and the multi-purpose key 19. A ROM 76 stores various programs and so forth. In these programs, a picture filing program is included. The CPU 74 loads the picture filing program into a RAM 77 and executes various steps described in the program in accordance with commands inputted from the picture filing key 23.

In the grouping mode, the CPU 74 writes the link information when the photographed picture is recorded in the memory card 14. Meanwhile, when the image data is read from the memory card 14, it is judged on the basis of the link information whether the picture is grouped or not. In a case the picture is grouped, various processes are executed on the basis of the link information. By the way, when the group is edited, the link information is rewritten as the need arises.

A VRAM 79 is a picture outputting member for outputting various pictures and images to the display panel 24. In this embodiment, the display panel 24 provided on a camera body is described as a monitor. However, the image and the picture may be outputted via a video output terminal to a monitor separated from the camera body. In doing so, it is possible to carry out a picture filing operation with a larger screen after photographing. This is very convenient.

A USB (Universal Serial Bus) interface 80 is a communication interface for transferring the data of the picture file stored in the memory card 14. The picture file of the memory card 14 is transferred to an external apparatus of a printer and so forth. Besides the USB interface 80, there are various kinds of the communication interfaces. For instance, there is a communication interface based on IEEE1394 standard. Any of the communication interfaces may be used.

An operation of the above structure is described below. When a camera user wants to group the pictures at the time of photographing, the camera user presses the grouping button 23a before photographing. When making a new group, the camera user presses the partitioning button 23b. Further, when editing the group after photographing, the camera user performs editing with the deleting button 23c, the linking button 23d and the dividing button 23e.

In this way, the taken picture is recorded in the memory card 14 in the filing state. By using a personal computer having the installed software of picture viewer software, electronic-album editing software and so forth, which are applicable to the link information, it is possible to transfer and copy the data group by group on the basis of the link information of the pictures recorded in the memory card 14.

When the transfer and the copy of the data are carried out group by group, the display panel 24 shows the index-picture 41 and the representative frame of the desired group is designated with the cursor 42. Upon instructing the transfer and the copy in the state that the representative frame is designated, the data of all the picture files belonging to the group are transferred to the other apparatus connected to the digital camera 10 via the USB interface 80. The other apparatus is a personal computer, a printer and so forth.

Figure 11:
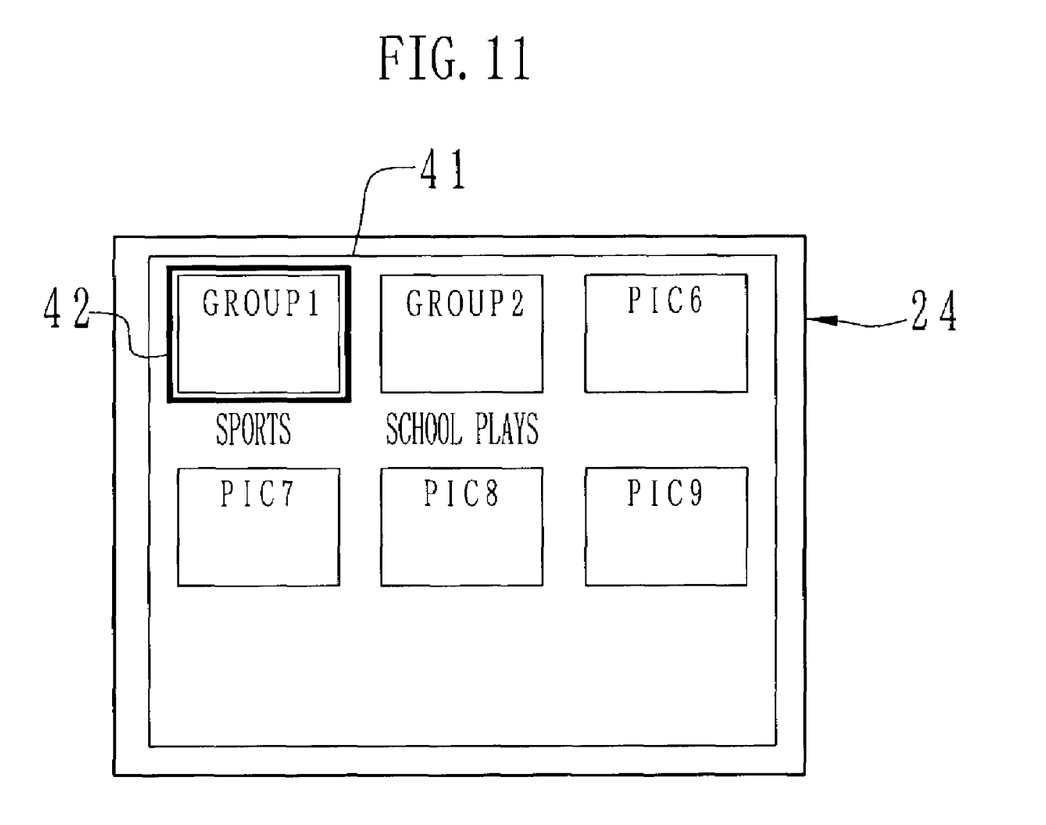
FIG. 11 is an explanatory illustration showing an index-picture of folder in which group names are displayed.

FIG. 11 shows an example in that group names of "SPORTS" and "SCHOOL PLAYS" are displayed near the representative frame of the corresponding groups in the index-picture 41. The group name is inputted via the digital camera, the picture viewer software, the electronic-album displaying software and so forth. The inputted information is recorded as the link information, for example. If letter information of the group name, comments and so forth are displayed within or near the representative frame in the above manner, classification of the pictures becomes clearer.

In the above embodiment, as the grouping information, is described the link information for linking the frame pictures of the group in the daisy-chain style. However, instead of storing the link information in the respective picture files, a grouping-information file may be made differently from the picture file. On the basis of the grouping-information file, the picture group may be managed.

Figure 12:
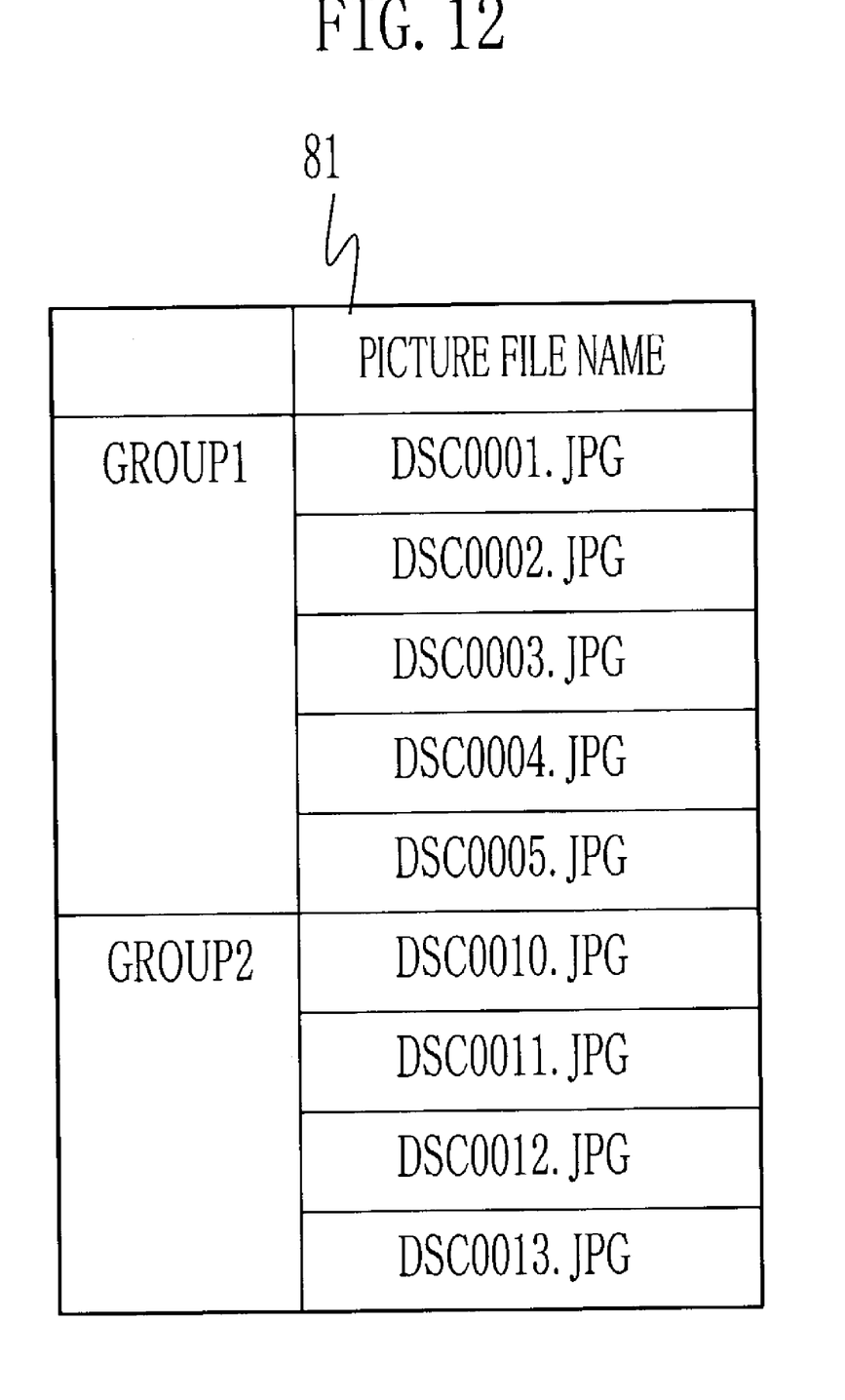
FIG. 12 is an explanatory illustration showing a grouping-information file.

FIG. 12 shows an example of the grouping-information file. In the grouping-information file 81, is recited a relationship between the group ID and the picture file names belonging to the group, for instance. Whenever a picture is taken after selecting the grouping mode, the content of the grouping information file 81 is updated.

In the forgoing embodiment, the pictures taken during the selection of the grouping mode belong to the same group if a partitioning operation is not carried out. However, a key item (grouping key) for grouping the information of the image data, the additional information and so forth included in the picture file may be set. On the basis of the grouping key set in this way, the group may be made up. As to the information included in the picture file, there are picture-title information, photographic-date information, photographic-place information, subject information and so forth. The picture-title information is optionally inputted by a user for the respective pictures, such as "SCHOOL PLAYS" and "SPORTS".

The photographic-place information is optionally inputted by the user every picture. Alternatively, when the digital camera is provided with GPS (Global Positioning System) function, the photographic-place information is positional information obtained thereby. The subject information represents a kind of a main subject of a person, a landscape and so forth, and is also inputted by the user for the respective pictures. It is needless to say that an image-analyzing function may be provided to analyze the image data thereby. By checking whether the picture file includes an image of a specific parson registered in advance, the picture files including the specific-parson image may be grouped.

Among the information included in the picture file, upon setting the picture-title information of the "SCHOOL PLAYS" as the grouping key, setting information that the "SCHOOL PLAYS" is the grouping key is recorded in the memory card as the grouping information. The grouping key is specified by the grouping information. In accordance with whether the information corresponding to the grouping key is included or not in the picture file, it is distinguished whether or not the picture file belongs to the group concerned. In this way, the group is managed by checking whether the information designated by the grouping key exists or not in the respective picture files. According to this method, it is possible to manage the picture files group by group without recording the link information in the respective picture files and without making the grouping-information file independently from the picture file.

Figure 13:
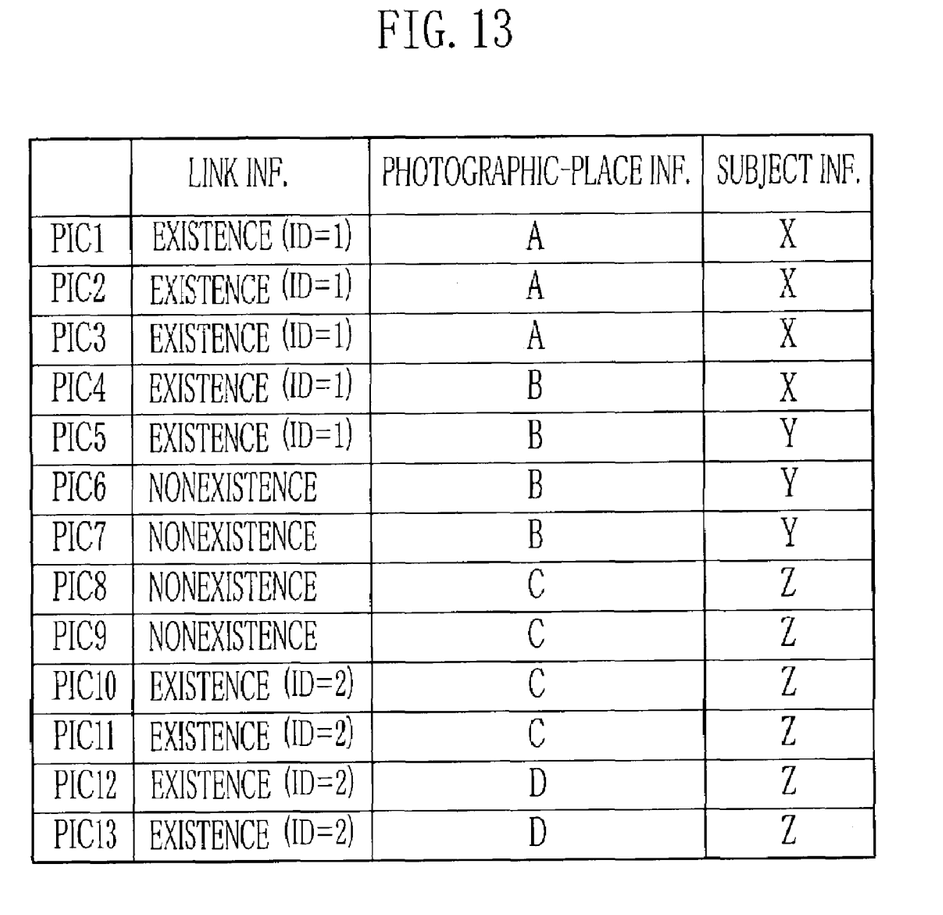
FIG. 13 is an explanatory illustration showing a case in that a plurality of grouping keys are used.

Incidentally, a plurality of the grouping keys may be set so as to make up the groups in accordance with the respective grouping keys. For example, as shown in FIG. 13, the respective picture files (PIC1 through PIC13) include various information of the link information, the photographic-place information, the subject information and so forth, which are usable as the grouping key. In this case, when the "link information" is set as the grouping key, five pictures of PIC1 to PIC5 having the group ID "1" constitute a group, and four pictures of PIC10 to PIC13 having the group ID "2" constitute another group. PIC6 to PIC 9 having no link information do not belong to any group.

Meanwhile, when the photographic place is set as the grouping key, the pictures of PIC1 to PIC3 having the photographic-place information "A" constitute a first group, and the pictures of PIC4 to PIC7 having the photographic-place information "B" constitute a second group. Further, the pictures of PIC8 to PIC11 having the photographic-place information "C" constitute a third group, and the pictures of PIC12 and the PIC13 having the photographic-place information "D" constitute a fourth group. Regarding the grouped pictures, the representative frame thereof is displayed in the forgoing index-picture.

The user can optionally determine the information to be set as the grouping key. Further, the grouping key already set may be changed to the other key.

In this way, it is possible to set the plural grouping keys. When it is desired to print the pictures of the same photographic place at a time, the photographic place is set as the grouping key. Meanwhile, when it is desired to print the pictures of the same subject at a time, the group key is changed to the subject information. The group formation may be changed at will. This is very convenience.

Furthermore, the group may be made up by combining the plural grouping keys. For example, in a case the photographic-place information "B" and the subject information "Y" are set as the grouping keys, the couple of the grouping keys form an AND condition so that three pictures PIC5 to PIC7 including both of the grouping keys constitute a single group. Of course, the group may be made up under an OR condition formed by the plural grouping keys.

In the foregoing embodiment, the digital camera with the picture filing function is described as an example. The present invention, however, may be applied to a picture filing device provided with no photographing function. By incorporating the picture filing function into the picture viewer software and the electronic-album software, a picture filing device, base of which is a personal computer, may be provided at low cost. In this case, a recording medium is not exclusive to the memory card. Various recording media of CD (Compact Disk), DVD (Digital Versatile Disk), MO (Magnetic Optical) media, HD (Hard Disk) and so forth may be used. Incidentally, the picture filing function may be provided in a scanner.

In the foregoing embodiment, a static image is described as an example. However, a plurality of frame pictures produced from a dynamic image may be grouped. In this case, when grouping the frame pictures, a user may designate any of the frame pictures by a manual operation. In another way, grouping the frame pictures may be automatically performed by the digital camera and the picture filing device.

In the case that grouping is automatically performed, is preset distinctive information for distinguishing the frame picture to be grouped. The distinctive information relates to a single dynamic-image file, one scene thereof, and so forth. Based on the distinctive information, the camera and the picture filing device distinguish the frame picture to be grouped, and give the link information thereto. If the digital camera and the picture filing device are provided with a function for producing the frame pictures from the dynamic image, the process for grouping the produced frame pictures may be automatically executed successively to the frame-picture producing process.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A picture filing device for recording a plurality of frame pictures in a recording medium, said picture filing device comprising:

information recording means for recording picture-grouping information, which is used for grouping said frame pictures, in said recording medium, said frame pictures being managed group by group defined by said picture-grouping information, wherein said picture-grouping information is link information for linking said frame pictures of one group in a daisy-chain style, wherein said frame pictures include a first frame picture, a second frame picture and a third frame picture, the first and third frame pictures being related to the second frame picture, wherein each of the frame pictures is stored in said recording medium as a picture file, and the link information of the second frame picture includes file names of the picture files of the first and third frame pictures.

2. A picture filing device according to claim 1, wherein the first and third frame pictures are the frame pictures recorded just before and after the second frame picture.

3. A picture filing device according to claim 2, wherein said recording medium is a memory card provided with a picture folder for storing said picture file.

4. A digital camera for recording a plurality of frame pictures, which are obtained by imaging means, in a recording medium, said digital camera comprising:

information recording means for recording picture-grouping information, which is used for grouping said frame pictures, in said recording medium, said frame pictures being managed group by group defined by said picture-grouping information.

wherein said picture-grouping information is link information for linking said frame pictures of one group in a daisy-chain style, wherein said frame pictures include a first frame picture, a second frame picture and a third frame picture, the first and third frame pictures being related to the second frame picture, wherein each of the frame pictures is stored in said recording medium as a picture file, and the link information of the second frame picture includes file names of the picture files of the first and third frame pictures.

5. A digital camera according to claim 4, wherein the first and third frame pictures are the frame pictures recorded just before and after the second frame picture.

6. A digital camera according to claim 5, wherein said recording medium is a memory card provided with a picture folder for storing said picture file.

7. A digital camera according to claim 6, wherein said memory card is set into a slot formed in a side face of said digital camera.

8. A digital camera according to claim 4, further comprising:

a deleting button to be used for deleting any of said frame pictures from said group, said file name included in the link iiiformadon being changed with respect to the frame picture related to the deleted frame picture.

9. A digital camera according to claim 4, further comprising:

a linking button to be used for linking said groups to make a new group, said file name included in the link information being changed with respect to the frame picture selected for linkage of the groups.

10. A digital camera according to claim 4, further comprising:

a dividing button to be used for dividing said group into a plurality of new groups, said file name included in the link information being changed with respect to the frame picture selected for division of the group.

* * * * *